(12) United States Patent
Chen et al.

(10) Patent No.: US 11,328,596 B2
(45) Date of Patent: May 10, 2022

(54) PARKING PREDICTION

(71) Applicant: GM GLOBAL TECHNOLOGY OPERATIONS LLC, Detroit, MI (US)

(72) Inventors: Shu Chen, Rochester Hills, MI (US); Jinzhu Chen, Troy, MI (US); Fan Bai, Ann Arbor, MI (US); Donald K. Grimm, Utica, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 59 days.

(21) Appl. No.: 16/508,943

(22) Filed: Jul. 11, 2019

(65) Prior Publication Data

US 2021/0012660 A1    Jan. 14, 2021

(51) Int. Cl.
*G08G 1/14* (2006.01)
*G06N 5/04* (2006.01)
*G01C 21/36* (2006.01)

(52) U.S. Cl.
CPC ........ *G08G 1/143* (2013.01); *G01C 21/3685* (2013.01); *G06N 5/046* (2013.01); *G08G 1/146* (2013.01)

(58) Field of Classification Search
CPC .... G08G 1/143; G08G 1/146; G01C 21/3685; G06N 5/046
See application file for complete search history.

(56) References Cited

U.S. PATENT DOCUMENTS

| 9,747,797 B1* | 8/2017 | Ghosh | G08G 1/143 |
| 10,032,368 B1* | 7/2018 | Thompson | G06Q 30/0284 |
| 10,066,954 B1* | 9/2018 | Swanson | G01C 21/3691 |
| 10,636,305 B1* | 4/2020 | Schmidt | H04W 4/44 |
| 2004/0039632 A1* | 2/2004 | Han | G07B 15/02 705/13 |
| 2012/0265585 A1* | 10/2012 | Muirbrook | G06Q 20/3276 705/13 |
| 2013/0249711 A1* | 9/2013 | Vellore Sripathi Rao | G08G 1/144 340/932.2 |
| 2014/0145862 A1* | 5/2014 | Wang | G08G 1/142 340/932.2 |
| 2014/0236686 A1* | 8/2014 | Grush | G07B 15/02 705/13 |
| 2014/0266800 A1* | 9/2014 | Koukoumidis | G08G 1/146 340/932.2 |
| 2014/0340242 A1* | 11/2014 | Belzner | G08G 1/143 340/932.2 |

(Continued)

*Primary Examiner* — Nay Tun
(74) *Attorney, Agent, or Firm* — Cantor Colburn LLP (57) ABSTRACT

In one example implementation, a computer-implemented method includes receiving, by a host processing device, timestamps from a vehicle processing system of a target vehicle, the timestamps being determined based at least in part on parking area data for a target parking area and vehicle data for the target vehicle. The method further includes calculating, by the host processing device, an arrival rate and a service rate based on the timestamps. The method further includes calculating, by the host processing device, a probability of parking availability for the target parking area based at least in part on the arrival rate and the service rate. The method further includes controlling, by the host processing device, the vehicle based at least in part on the probability of parking availability for the target parking area.

8 Claims, 11 Drawing Sheets

(56) References Cited

U.S. PATENT DOCUMENTS

| | | | |
|---|---|---|---|
| 2015/0161890 A1* | 6/2015 | Huntzicker | G08G 1/147 340/932.2 |
| 2016/0019790 A1* | 1/2016 | Tobolski | G08G 1/0969 340/932.2 |
| 2016/0196747 A1* | 7/2016 | Tsyrklevich | G08G 1/143 701/532 |
| 2016/0253847 A1* | 9/2016 | Ullrich | G08G 1/065 705/13 |
| 2017/0118307 A1* | 4/2017 | Beaurepaire | G08G 1/143 |
| 2017/0178511 A1* | 6/2017 | Berns | G08G 1/143 |
| 2017/0186317 A1* | 6/2017 | Franklin | G08G 1/149 |
| 2018/0186309 A1* | 7/2018 | Batten | B60Q 1/503 |
| 2018/0274930 A1* | 9/2018 | Wisbrun | G01C 21/3617 |
| 2018/0349792 A1* | 12/2018 | Zhao | G06F 16/285 |
| 2019/0261131 A1* | 8/2019 | Keil | H04W 68/04 |
| 2020/0011671 A1* | 1/2020 | Puri | G01C 21/3492 |

* cited by examiner

PARKING PREDICTION

The present disclosure relates to performing parking prediction for a vehicle.

Modern vehicles (e.g., a car, a motorcycle, a boat, or any other type of automobile) may be equipped with navigation systems that provide navigation information to drivers of the vehicles. For example, a navigation system can provide maps, points of interest such as parking areas, route guidance in the form of visual and/or audible directions and other navigation information to drivers of the vehicle.

SUMMARY

In one exemplary embodiment, a computer-implemented method for parking prediction is provided. The method includes receiving, by a host processing device, timestamps from a vehicle processing system of a target vehicle, the timestamps being determined based at least in part on parking area data for a target parking area and vehicle data for the target vehicle. The method further includes calculating, by the host processing device, an arrival rate and a service rate based on the timestamps. The method further includes calculating, by the host processing device, a probability of parking availability for the target parking area based at least in part on the arrival rate and the service rate. The method further includes controlling, by the host processing device, the vehicle based at least in part on the probability of parking availability for the target parking area.

In additional examples, the arrival rate defines a frequency of vehicles seeking parking at the target parking area, and wherein the service rate defines an inverse of the average duration vehicles stay at the target parking area.

In additional examples, calculating the arrival rate and the service rate based on the timestamps further includes applying a Markov chain model to determine the arrival rate and the service rate.

In additional examples, calculating the arrival rate and the service rate based on the timestamps further includes applying a trace mining algorithm to the vehicle data.

In additional examples, the vehicle processing system is located in the vehicle and wherein the parking processing system is located remotely from the vehicle.

In additional examples, the timestamps include an arrival timestamp, a searching timestamp, a parking timestamp, and an exiting timestamp.

In additional examples, the vehicle data for the target vehicle is received from at least one of a global positioning system module associated with the target vehicle or an electronic control unit associated with the target vehicle.

In additional examples, the method further includes receiving, by the host processing device, second timestamps from the vehicle processing system of the target vehicle, the second timestamps being determined based at least in part on parking area data for a second target parking area and the vehicle data for the target vehicle. The method further includes calculating, by the host processing device, a second arrival rate and a second service rate based on the second timestamps. The method further includes calculating, by the host processing device, a second probability of parking availability for the second target parking area based at least in part on the second arrival rate and the second service rate.

In additional examples, the method further includes comparing the first probability of parking availability and the second probability of parking availability. The method further includes controlling the target vehicle based on the comparing.

In another exemplary embodiment a system includes a memory having computer readable instructions and a processing device for executing the computer readable instructions for performing a method for parking prediction. The method includes performing, by the processing device, an entrance crossing detection to detect that a vehicle enters a parking area. The method further includes responsive to detecting that the vehicle enters the parking area, performing, by the processing device, a parking activity detection to determine whether the vehicle parks in the parking area. The method further includes performing, by the processing device, an exit crossing detection to detect that the vehicle exits the parking area. The method further includes determining, by the processing device, a probability of parking availability for the parking area. The method further includes controlling another vehicle based on probability of parking availability for the parking area.

In additional examples, performing the entrance crossing detection further includes determining whether the vehicle enters the parking area by comparing telemetry data associated with the vehicle to a geofence.

In additional examples, performing the entrance crossing detection further includes, responsive to determining that the vehicle enters the parking area, setting an entering timestamp value.

In additional examples, performing the parking activity detection includes: comparing a current timestamp to a previous timestamp to determine a difference; determining whether the difference is greater than a threshold, responsive to determining that the difference is greater than the threshold, determining whether a position of the vehicle is contained within a boundary, and responsive to determining that the position of the vehicle is contained within the boundary, setting a parking timestamp value.

In additional examples, performing the exit crossing detection further includes determining whether the vehicle exits the parking area by comparing telemetry data associated with the vehicle to a geofence.

In additional examples, performing the exit crossing detection further includes, responsive to determining that the vehicle exits the parking area, setting an exit timestamp value.

In yet another exemplary embodiment a computer program product includes a computer readable storage medium having program instructions embodied therewith, wherein the computer readable storage medium is not a transitory signal per se, the program instructions executable by a processing device to cause the processing device to perform a method for parking prediction. The method includes receiving, by the processing device, a geofence boundary to define an indoor parking structure. The method further includes receiving, by the processing device, vehicle data from a target vehicle. The method further includes determining, by the processing device, whether the vehicle is within the indoor parking structure based at least in part on the vehicle data and the geofence boundary.

In additional examples, determining whether the vehicle is within the indoor parking structure further includes comparing an entry threshold to a counter, wherein it is determined that the vehicle is within the indoor parking structure when the entry threshold is greater than the counter.

In additional examples, determining whether the vehicle is within the indoor parking structure further includes comparing an entry threshold to a counter, wherein it is determined that the vehicle is not within the indoor parking structure when the entry threshold is not greater than the counter and a GPS has not drifted.

In additional examples, determining whether the vehicle is within the indoor parking structure further includes comparing an exit threshold to a counter, wherein it is determined that the vehicle is within the indoor parking structure when the exit threshold is not greater than the counter.

In additional examples, wherein determining whether the vehicle is within the indoor parking structure further includes comparing an exit threshold to a counter, wherein it is determined that the vehicle is not within the indoor parking structure when the exit threshold is greater than the counter and a GPS has not drifted.

The above features and advantages, and other features and advantages, of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein provide for parking prediction. To do this, according to an example, the present techniques use timestamps determined using parking area data and vehicle data to calculate an arrival rate and a service rate. A probability of parking availability is then calculated based on the arrival rate and the service rate, and the driver is informed or vehicle is controlled (e.g., automatically/autonomously) based on the probability of parking availability for a target parking area.

The present techniques use vehicle data for a target vehicle. The trace data can include telemetry data for the vehicle. Thus, the present techniques can use the trace data to make a near-real-time assessment of parking availability based on vehicle movements near parking garages or structures. The statistical approach provided herein enables estimation of which areas may have available parking based on analysis of entry/exits and travel patterns within the parking areas.

Accordingly, the presented techniques improve parking and vehicle operation by enabling the vehicle to park efficiently without wasting time, fuel/power, etc. thereby improving the operation of the vehicle. For example, a vehicle can navigate directly to a parking area (such as a parking lot, parking garage, on-street parking, etc.) with a high probability of parking availability without navigating to parking areas with lower probability of parking availability. This saves time, fuel/power, reduces wear and tear on the vehicle, and the like, thus improving vehicle performance.

Figure 1:
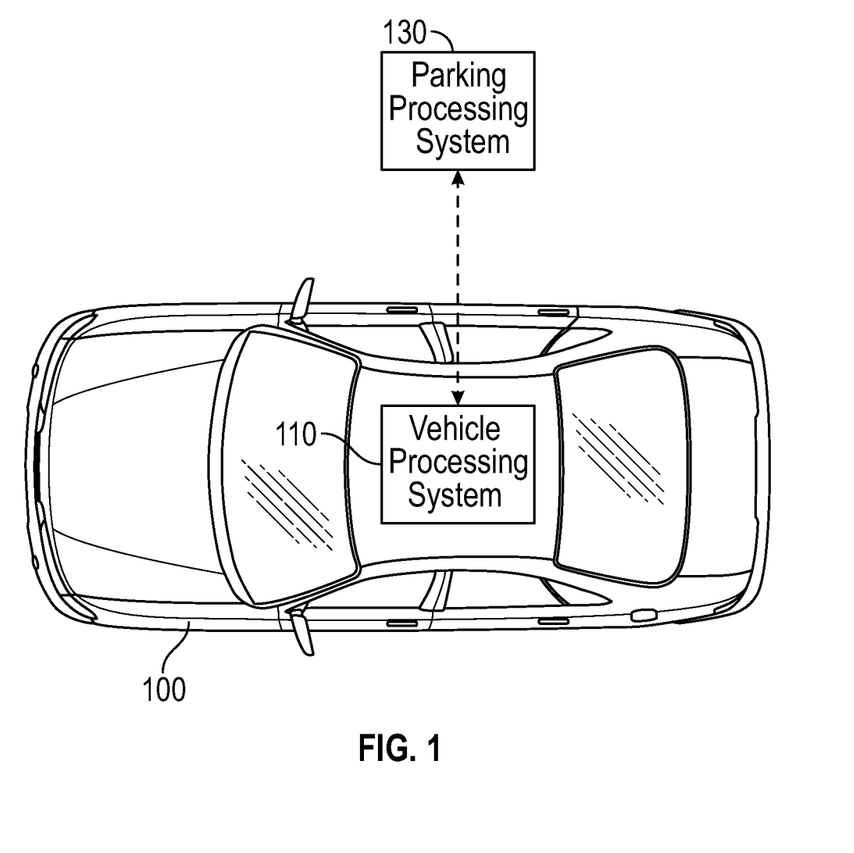
FIG. 1 depicts a block diagram of a vehicle including a processing system for parking prediction according to one or more embodiments described herein.

FIG. 1 depicts a block diagram of a target vehicle 100 including a vehicle processing system 110 communicatively coupled to a parking processing system 130 (also referred to as a "host processing device") for parking prediction according to one or more embodiments described herein. In the example of FIG. 1, the target vehicle 100 includes the processing system 110, and the target vehicle 100 can be a car, truck, van, bus, motorcycle, boat, plane, or another suitable vehicle 100.

The parking processing system 130 is remote to the target vehicle 100 and is communicatively couplable to the vehicle processing system 110 by a communication link 111. The communication link 111 can be any suitable communication protocol to enable the vehicle processing system 110 and the parking processing system 130 to communicate (e.g., exchange data by transmitting and receiving data). For example, the communication link 111 can be a wireless (or wired) communication link that enables communication via radio frequency, cellular network, WiFi, Bluetooth, digital short-range communication (DSRC), and/or any other suitable communication protocol and combinations thereof.

The parking processing system 130 utilizes vehicle data and parking area data to predict parking availability for a target parking area by calculating an arrival rate and a service rate based on timestamps received from the vehicle processing system 110 of the vehicle 100. A probability of parking availability can then be calculated based on the arrival rate and the service rate, and the vehicle 100 can be controlled based on the probability of parking availability, such as to navigate to a particular parking area. The components of the vehicle processing system 110 and the host processing system 130, which enable parking prediction, are shown and described in more detail with reference to FIG. 2.

Figure 2:
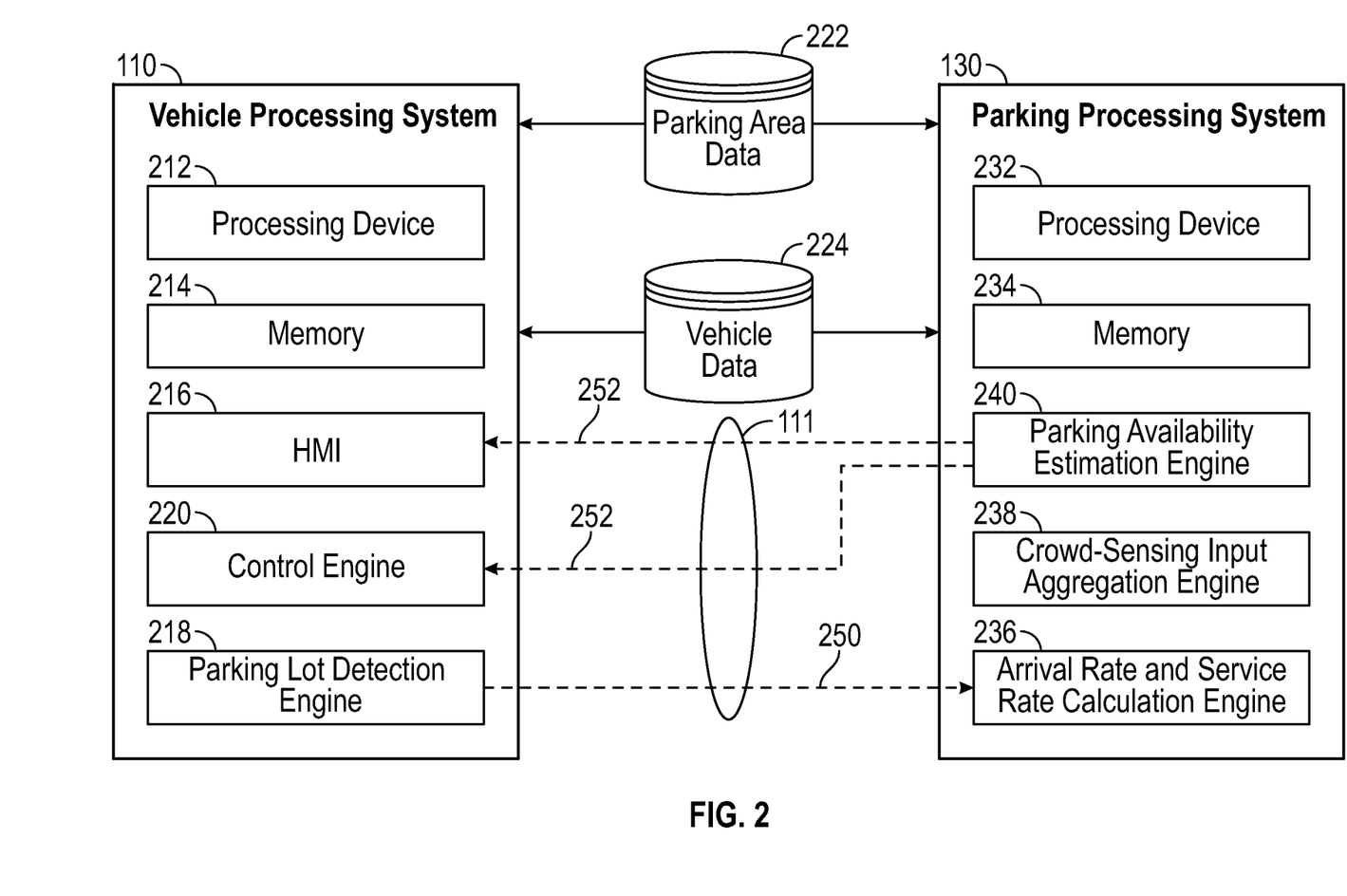
FIG. 2 depicts a block diagram of the vehicle processing system and the parking processing system for parking prediction of FIG. 1 according to one or more embodiments described herein.

In particular, FIG. 2 depicts a block diagram of the vehicle processing system 110 and the parking processing system 130 for parking prediction according to one or more embodiments described herein.

The vehicle processing system includes a processing device 212 (e.g., the processor 1221 of FIG. 12), a memory 214 (e.g., the RAM 1224 of FIG. 12), a human-machine interface (HMI) 216 (e.g., the display 1235, which can be a touch-input enabled display device), a parking lot detection engine 218, and a control engine 220.

The parking processing system 130 includes a processing device 232 (e.g., the processor 1221 of FIG. 12), a memory 234 (e.g., the RAM 1224 of FIG. 12), an arrival rate and service rate calculation engine 236, a crowd-sensing input aggregation engine 238, and a parking availability estimation engine 240.

One or more of the vehicle processing system 110 or the parking processing system 130 can receive parking area data 222 and/or vehicle data 224. The vehicle processing system 110 and the parking processing system 130 can also transmit and receive data between one another (and/or between another suitable processing device and/or processing system) via the communication link 111, as shown by the dashed arrows 250, 252. For example, the parking lot detection engine 218 can transmit data (e.g., timestamps, including an arrival timestamp, a searching timestamp, a parking timestamp, and/or an exiting timestamp) via the communication link 111 to the arrival rate and service rate calculation engine 236 as shown by the dashed arrow 250. Similarly, the parking availability estimation engine 240 can transmit data (e.g., parking availability and/or probability of parking availability information) via the communication link 111 to the HMI 216 and/or the control engine 220 as shown by the dashed arrows 252.

Although not shown, the processing system 110 can include other components, engines, modules, etc., such as a processor (e.g., a central processing unit, a graphics processing unit, a microprocessor, etc.), a memory (e.g., a random-access memory, a read-only memory, etc.), data store (e.g., a solid state drive, a hard disk drive, etc.) and the like. The features and functionality of the components of the processing system 110 are described further herein. The processing system 110 of the target vehicle 100 performs a joint radon transform association for tracking a target object relative to a vehicle.

Figure 3:
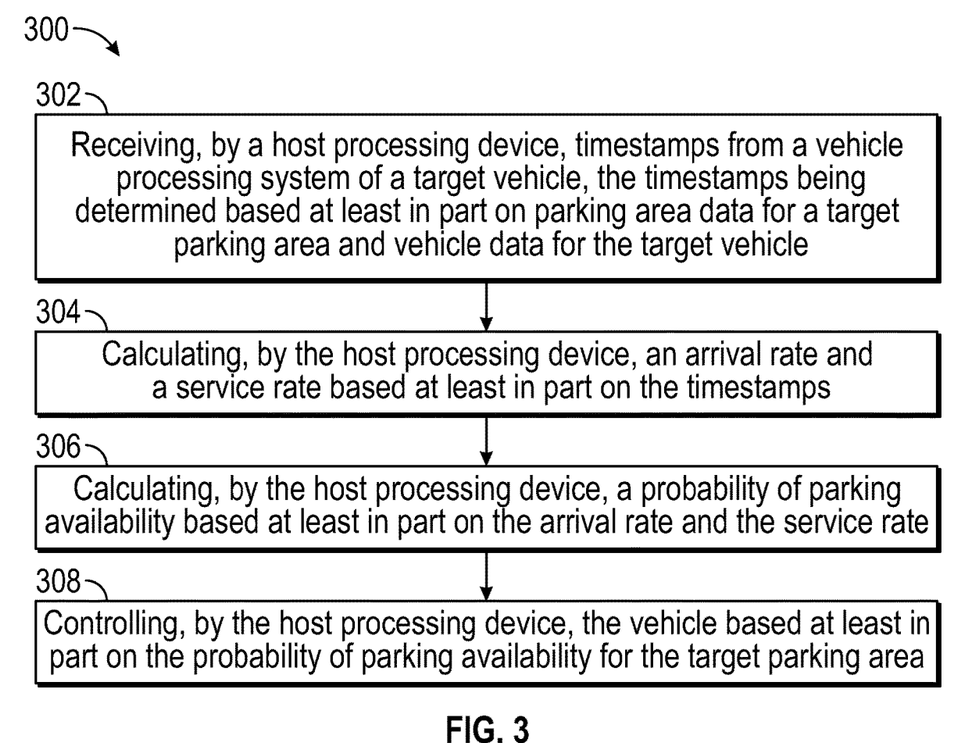
FIG. 3 depicts a flow diagram of a method for parking prediction according to one or more embodiments described herein.

This process is described further with reference to FIG. 3. In particular, FIG. 3 depicts a flow diagram of a method 300 for parking prediction according to one or more embodiments described herein. The method 300 can be performed by any suitable system or device such as the vehicle processing system 110 of FIGS. 1 and 2, the parking processing system 130 of FIGS. 1 and 2, the processing system 1200 of FIG. 12, or any other suitable processing system and/or processing device (e.g., a processor) and combinations thereof. The features and functionality of the method 300 are now described with reference to the components of FIGS. 1 and 2 but are not so limited.

At block 302, the parking processing system 130 receives timestamps from the vehicle processing system 110 of the target vehicle 100. The timestamps are determined based at least in part on parking area data 222 for the target parking area and vehicle data 224 for the target vehicle 100.

The timestamps can include one or more of the following: an arrival timestamp ($T_{arrival}$ or $T_{enter}$), a searching timestamp ($T_{searching}$), a parking timestamp ($T_{parking}$), and an exiting timestamp ($T_{exit}$). One or more of the timestamps can represent a moment in time (e.g., the arrival timestamp ($T_{arrival}$ or $T_{enter}$) and the exiting timestamp ($T_{exit}$)). One or more of the timestamps can represent a duration of time (e.g., the searching timestamp ($T_{searhcing}$) and the parking timestamp ($T_{parking}$)). The arrival timestamp indicates a time that a vehicle arrives at the target parking area. The searching timestamps indicates an amount (duration) of time a vehicle spends, on average, searching for parking in the target parking area. The parking timestamp indicates an amount of time a vehicle spends, on average, parked in the target parking area. The exiting timestamp indicates a time that a vehicle exits the target parking area.

The parking area data 222 is received from one or more maps, which may be publicly available and stored locally at the target vehicle 100, in a cloud computing environment, or in another suitable storage location. The vehicle data 224 for the target vehicle 100 can be received from a global positioning system (GPS) module (not shown) associated with the target vehicle 100 or an electronic control unit (ECU) (not shown) associated with the target vehicle. The vehicle data 224 can include latitude information, longitude information, elevation information, heading information, ignition information, and the like, and combinations thereof.

At block 304, the arrival rate and service rate calculation engine 236 of the parking processing system 130 calculates an arrival rate ($\lambda$) and a service rate ($\mu$) based on the timestamps. The arrival rate defines a frequency of vehicles seeking parking at the target parking area; the service rate defines an average duration vehicles stay at the target parking area. According to examples, the arrival rate and service rate calculation engine 236 calculates the arrival rate based on a mean vehicle arrival time and calculates the service rate based on the mean vehicle parking time.

Figure 4:
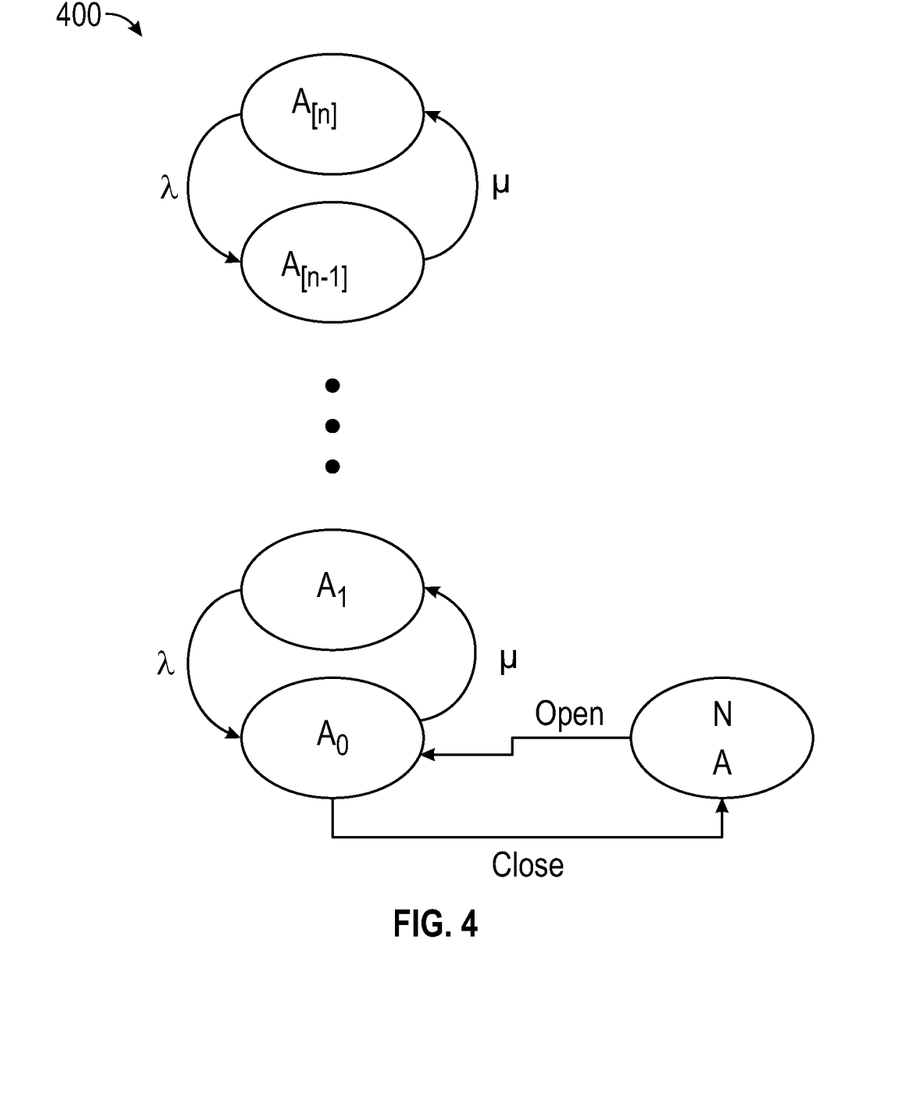
FIG. 4 depicts a block diagram of an example of a Markov chain model 400 according to one or more embodiments described herein.

According to examples, the arrival rate and service rate calculation engine 236 can apply a Markov chain model to determine the arrival rate and the service rate. FIG. 4 depicts a block diagram of an example of a Markov chain model 400 according to one or more embodiments described herein. In this example, $\lambda$ represents the arrival rate and $\mu$ represents the service rate. The arrival rate $\lambda$ is the arrival rate of vehicles looking for parking and can be derived, for example, based on a mean vehicle arrival time. The service rate $\mu$ is the average sojourn (mean waiting time)/parking time for a vehicle's stay at a particular parking area and can be derived, for example, based on a mean vehicle parking time. It should be appreciated that this Markov chain model 400 could be extended into a 2D Markov chain model when applying to multi-story parking structures.

With continued reference to FIG. 3, at block 306, the parking availability estimation engine 240 calculates a probability of parking availability using the arrival rate and the service rate. According to examples, the probability of parking availability is calculated by applying queuing theory modeling.

Queuing theory modeling can be expressed using Kendall's notation and considers the following: interval arrival time distribution M, service time/sojourn time distribution G, capacity of the parking area C, a maximum parking area capacity including waiting ∞, a number of arrival components ∞, and a queuing principal first in first out (FIFO)/first come first serve (FCFS).

Using Kendall's notation, the arrival rate $\lambda$ and the service rate $\mu$ are calculated as:

$$\text{Arrival Rate: } \lambda = \frac{\sigma_{ij}}{T_j - T_i}$$

$$\text{Service Rate: } \mu = \frac{C}{\sum_{i=0}^{n} W_i},$$

where $\sigma_{ij}$ is a number of entering events between two timestamps $T_i$ and $T_j$, $W_i$ is the sojourn time for the vehicle i, C is the capacity of the parking area.

Further, using Kendall's notation, the queuing theory modeling calculates a probability of availability for a parking area as follows:

$$\text{Probability of Available } P = 1 - \left[\left(\sum_{n=0}^{c-1} \frac{(c\rho)^n}{n!}\right) + \left(((c\rho))^c \left(\frac{1}{c!}\right)\frac{1}{1-\rho}\right)\right]^{-1}$$

where C is the capacity of the parking area, $\rho$ is the utilization rate express as $$\rho = \frac{\lambda}{c\mu},$$

and n is the number of vehicles. Accordingly, the probability of availability for a parking area is expressed as a value [0 . . . 1].

Further, a number of parked vehicles in long run (i.e., a number of parked vehicles) is expressed as $$L_n = \lambda w$$

and a waiting time for arriving vehicles is expressed as $$W_{queue} = w - \frac{1}{\mu}.$$

At block 308, the control engine 220 controls the target vehicle 100 based at least in part on the probability of parking availability for the target parking area. Controlling the target vehicle 100 can include increasing/decreasing speed, changing a direction, navigating to the target parking area, navigating to another parking area other than the target parking area, and the like. For example, if the probability of available parking in the target parking area is above a threshold, the control engine 220 navigates the target vehicle 100 to the target parking area or presents directions on a display to an operator of the target vehicle 100 so that the operator can navigate the target vehicle 100 to the target parking area. Accordingly, vehicle technology is improved by controlling the vehicle using the calculated probability of parking availability.

Figure 5:
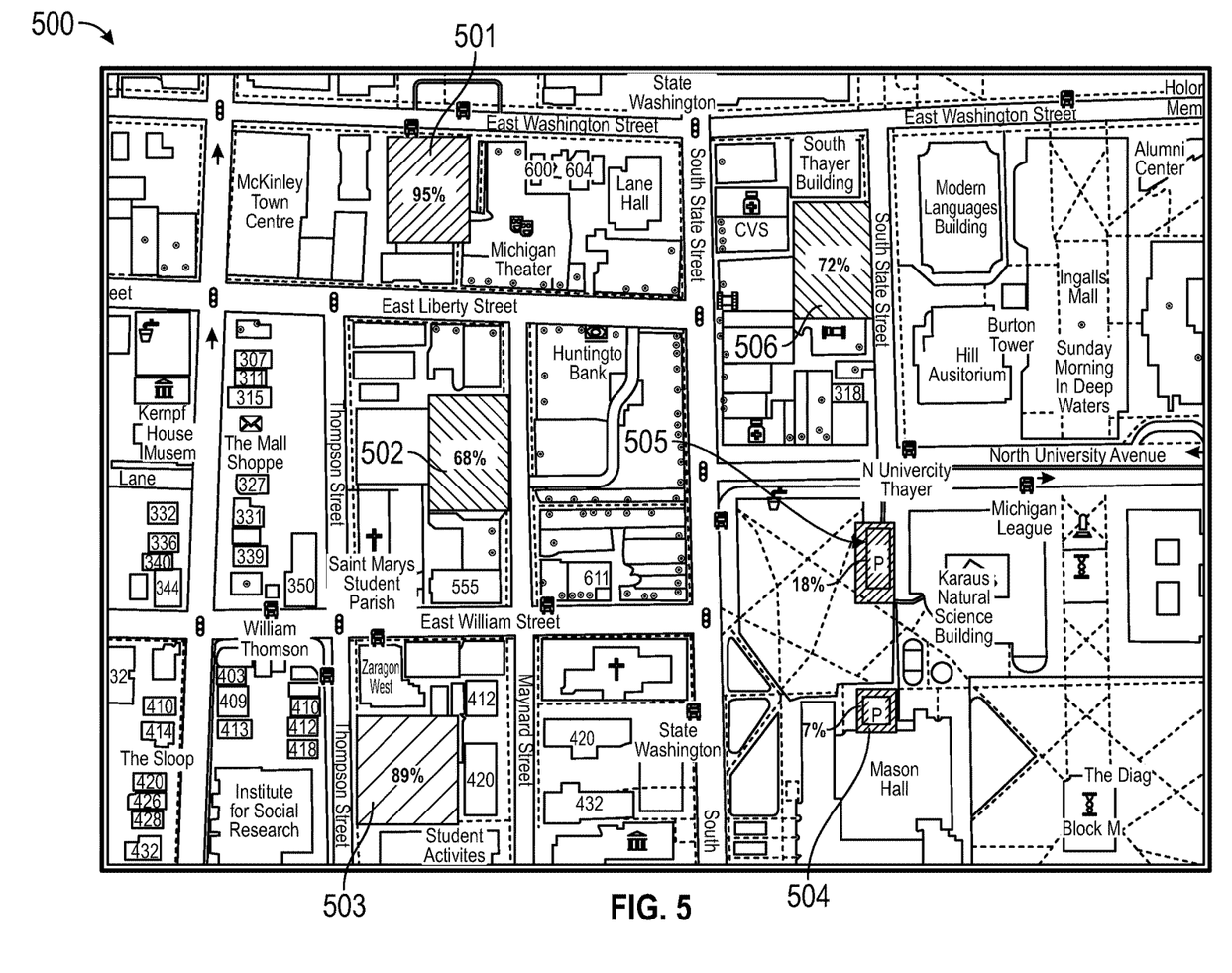
FIG. 5 depicts a map of parking areas having associated probabilities of parking availability according to one or more embodiments described herein.

Additional processes also may be included. For example, the probability for multiple parking areas can be determined using the present techniques, and the control engine 220 can control the target vehicle 100 based on the respective probabilities. As an example, FIG. 5 depicts a map 500 of parking areas 501, 502, 503, 504, 505, 506 having associated probabilities of parking availability according to one or more embodiments described herein. In this example, the parking area 501 has an associated probability of available parking of 95%, which is higher than the associated probability of available parking of parking areas 502 (68%), 503 (89%), 504 (7%), 505 (18%), or 506 (72%). In some examples, the target vehicle 100 can navigate to the parking area with the higher/highest probability, to the closest parking area with a probability above a threshold (which can be user-defined/adjusted), etc. It should be understood that the process depicted in FIG. 3 represents an illustration and that other processes may be added or existing processes may be removed, modified, or rearranged without departing from the scope and spirit of the present disclosure.

Embodiments directed to location-based parking detection are now described. Location-based parking detection describes detecting whether a target vehicle (e.g., the target vehicle 100) has parked in a particular parking area by performing parking entrance crossing detection, performing parking activity detection, and parking exit crossing detection. This is useful for determining the probability of available parking by determining whether cars park in a parking area after entering the parking area and before leaving the parking area. In other words, location-based parking detection determines whether a vehicle parks after entering a parking area or traverses the parking area without locating an available spot before exiting the parking area.

Figure 6A:
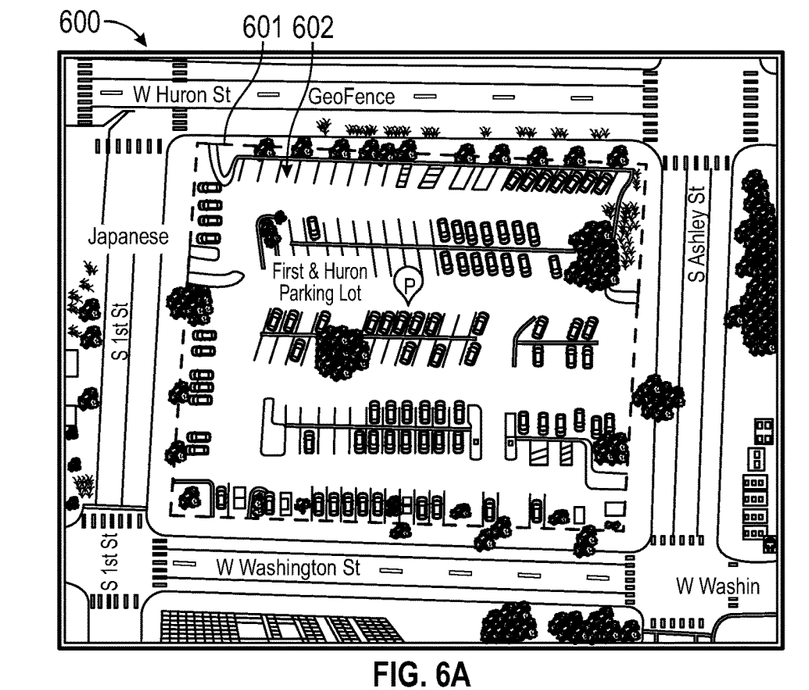
FIG. 6A depicts a map of candidates selection for location-based parking detection according to one or more embodiments described herein.
Figure 6B:
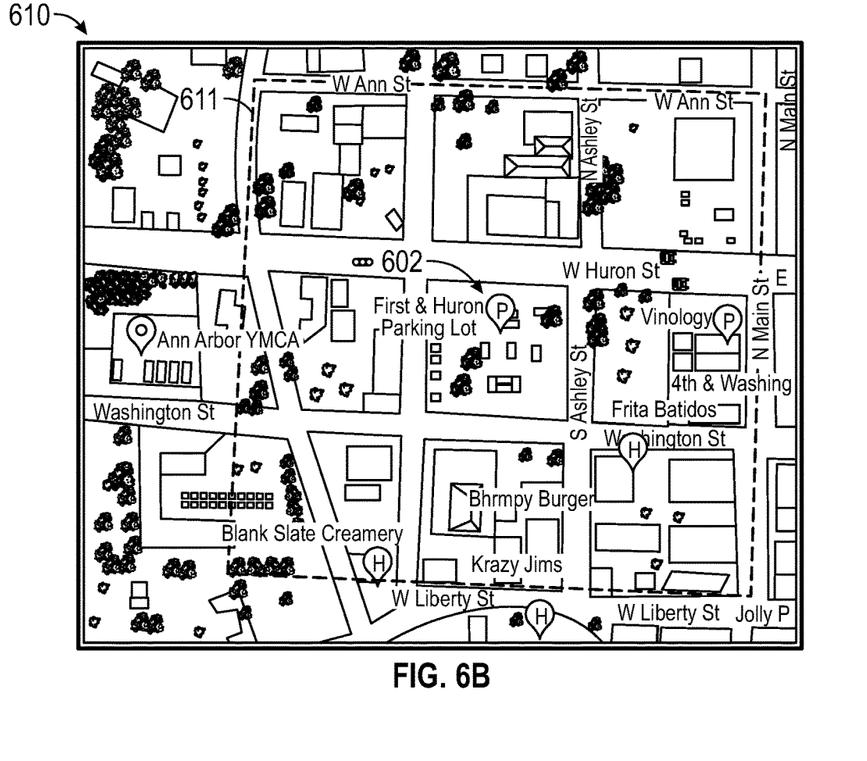
FIG. 6B depicts a map of trip extraction for location-based parking detection according to one or more embodiments described herein.

FIG. 6A depicts a map 600 of candidates selection for location-based parking detection according to one or more embodiments described herein. A geofence 601 is defined around the parameter of a parking area 602 using, for example, global positioning data or other data. FIG. 6B depicts a map 610 of trip extraction for location-based parking detection according to one or more embodiments described herein. A geospatial query is made to extract trip information from a target vehicle (e.g., the target vehicle 100), such as by receiving telemetry data from the vehicle processing system 110. By comparing the telemetry data to the defined geofence 601, location-based parking detection can be determined.

To perform location-based parking detection, entrance crossing detection, parking activity detection, and exit crossing detection are performed. These detections are further described with reference to FIGS. 7, 8, and 9.

Figure 7:
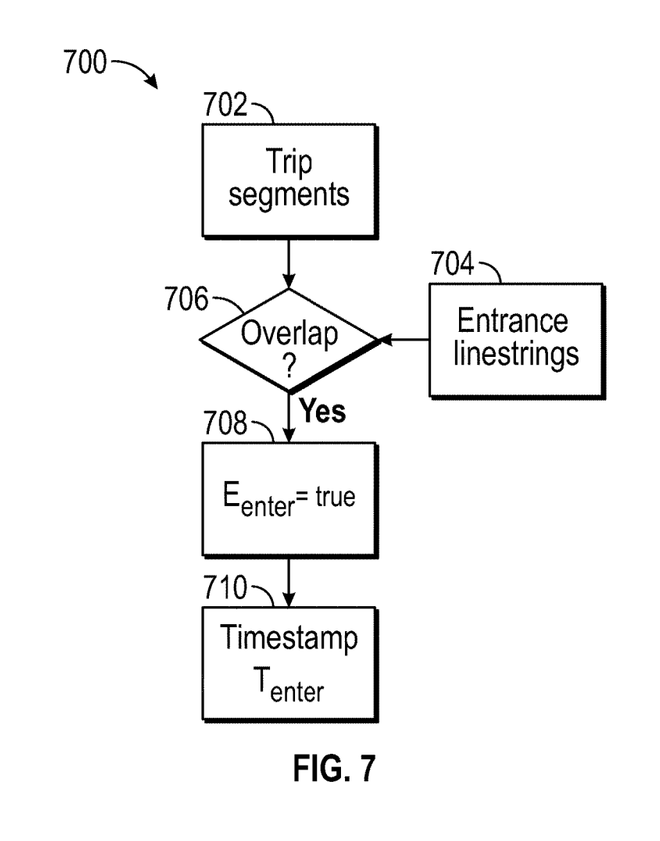
FIG. 7 depicts a flow diagram of a method for entrance crossing detection according to one or more embodiments described herein.

FIG. 7 depicts a flow diagram of a method 700 for entrance crossing detection according to one or more embodiments described herein. At block 702, trip segments (e.g., telemetry data from a vehicle) are received that identify the path of the vehicle. At block 704, entrance linestrings that define the geofence 601 (FIG. 6) are received. At decision block 706, it is determined whether the trip segments overlap with the geofence 601. If not, the method 700 ends or repeats. If an overlap is detected at decision block 706, an entrance parameter ($E_{enter}$) is set equal to "true" at block 708, and the timestamp value ($T_{enter}$) associated with the overlap is set at block 710. The timestamp value ($T_{enter}$) can be one of the timestamps described herein.

Figure 8:
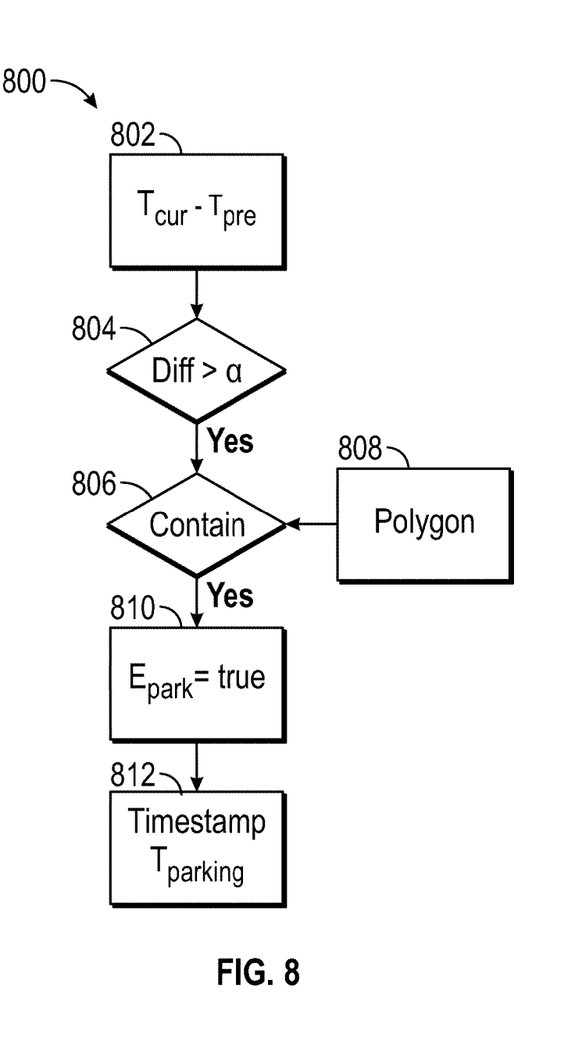
FIG. 8 depicts a flow diagram of a method for parking activity detection according to one or more embodiments described herein.

FIG. 8 depicts a flow diagram of a method 800 for parking activity detection according to one or more embodiments described herein. At block 802, a timestamp for a previous position ($T_{pre}$) is subtracted from a timestamp for a current position ($T_{cur}$). At decision block 804, it is determined whether the different from block 802 exceeds a threshold $\alpha$. If not, the method 800 ends or repeats. If the threshold $\alpha$ is exceeded at decision block 804, it is determined at decision block 806 whether the current position is within a boundary/polygon (e.g., the geospatial query of FIG. 6B) from block 808. If not, the method 800 ends or repeats. However, if it is determined that the current position is within the boundary/polygon at decision block 806, a parking parameter ($E_{park}$) is set equal to "true" at block 810, and the timestamp value ($T_{parking}$) associated with the containing is set at block 812. The timestamp value ($T_{parking}$) can be one of the timestamps described herein.

Figure 9:
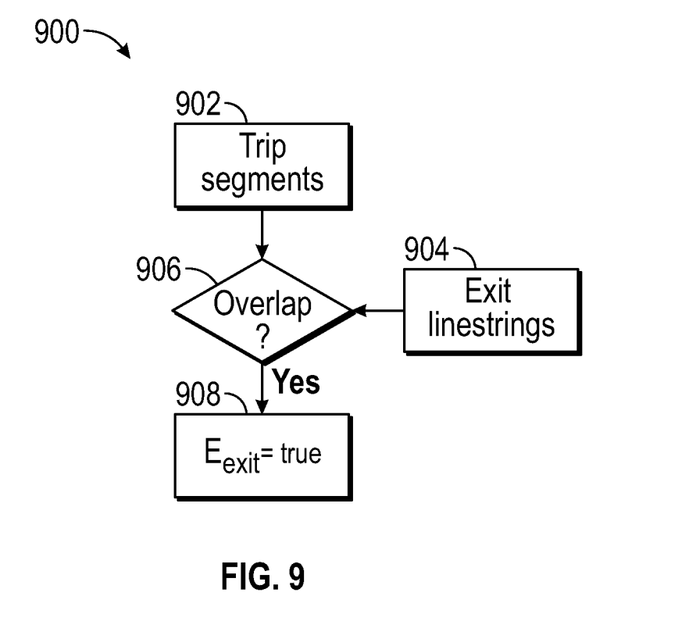
FIG. 9 depicts a flow diagram of a method for exit crossing detection according to one or more embodiments described herein.

FIG. 9 depicts a flow diagram of a method 900 for exit crossing detection according to one or more embodiments described herein. At block 902, trip segments (e.g., telemetry data from a vehicle) are received that identify the path of the vehicle. At block 904, exit linestrings that define the geofence 601 (FIG. 6) are received. At decision block 906, it is determined whether the trip segments overlap with the geofence 601. If not, the method 900 ends or repeats. If an overlap is detected at decision block 906, an exit parameter ($E_{exit}$) is set equal to "true" at block 908, and the timestamp value ($T_{exit}$) associated with the overlap is set (not shown). The timestamp value ($T_{exit}$) can be one of the timestamps described herein.

Figure 10:
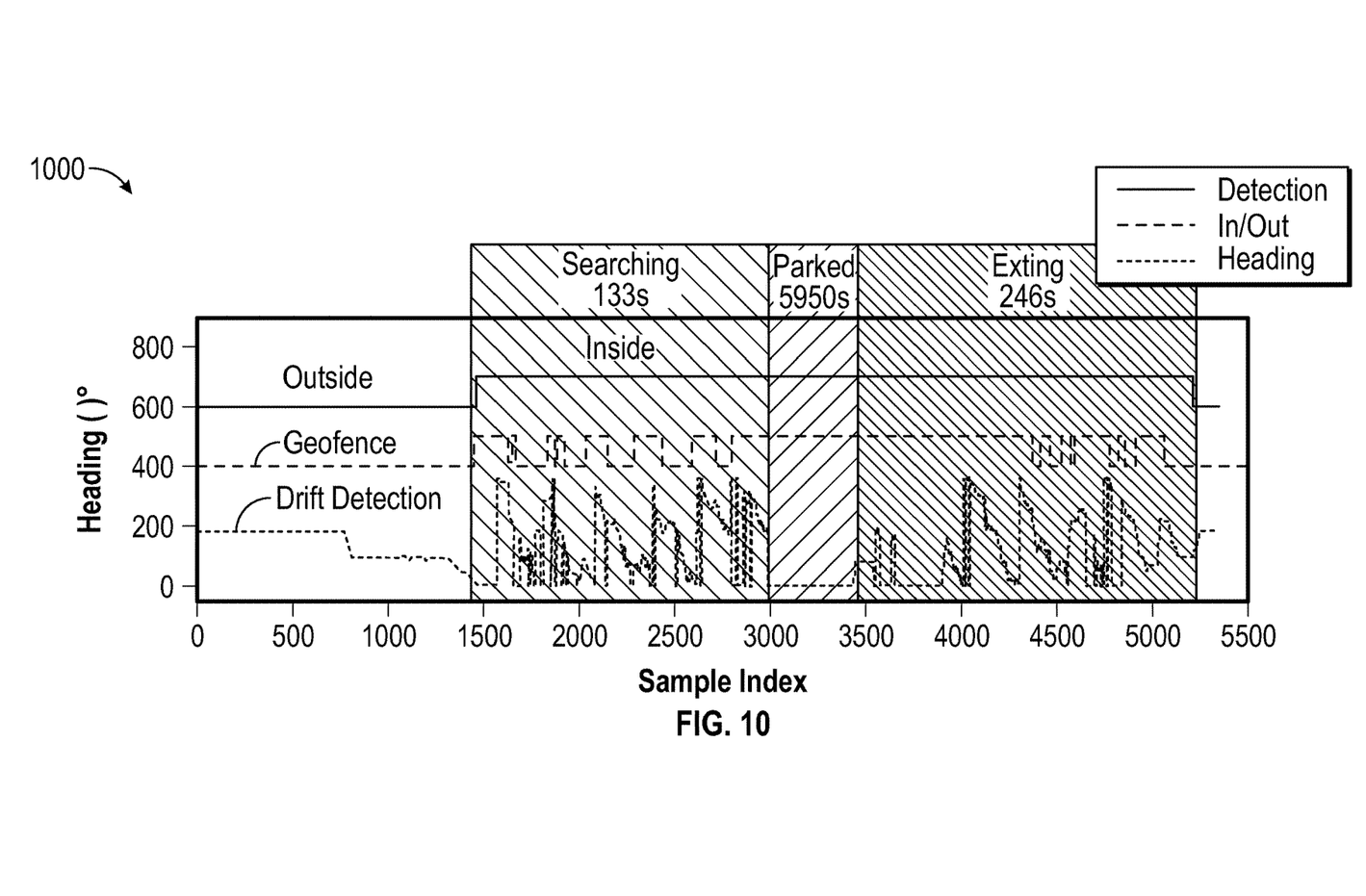
FIG. 10 depicts a graph of results of location-based parking detection according to one or more embodiments described herein.

FIG. 10 depicts a graph 1000 of results of location-based parking detection according to one or more embodiments described herein. As can be seen, heading data (vertical axis) shows a vehicle crossing from "outside" a geofence 601 (FIG. 6) of a parking area (e.g., one or more of the parking areas 501, 502, 503, 504, 505, 506 of FIG. 5) to "inside" the geofence at approximately timestamp value 1500. The vehicle then spent 133 seconds searching for parking, 5950 seconds parked, and 246 seconds exiting. Also shown on the graph 1000 is a drift detection value. The drift of a GPS signal can occur, such as when the GPS signal is impeded. This can occur when a vehicle is indoors for example (e.g., within a parking garage, in an underground parking facility, etc.). GPS drift can be detected in several ways, such as when heading variations are unusually large or when GPS jumps when comparing GPS distance with distance calculated from telemetry data (speed and time duration).

Figure 11:
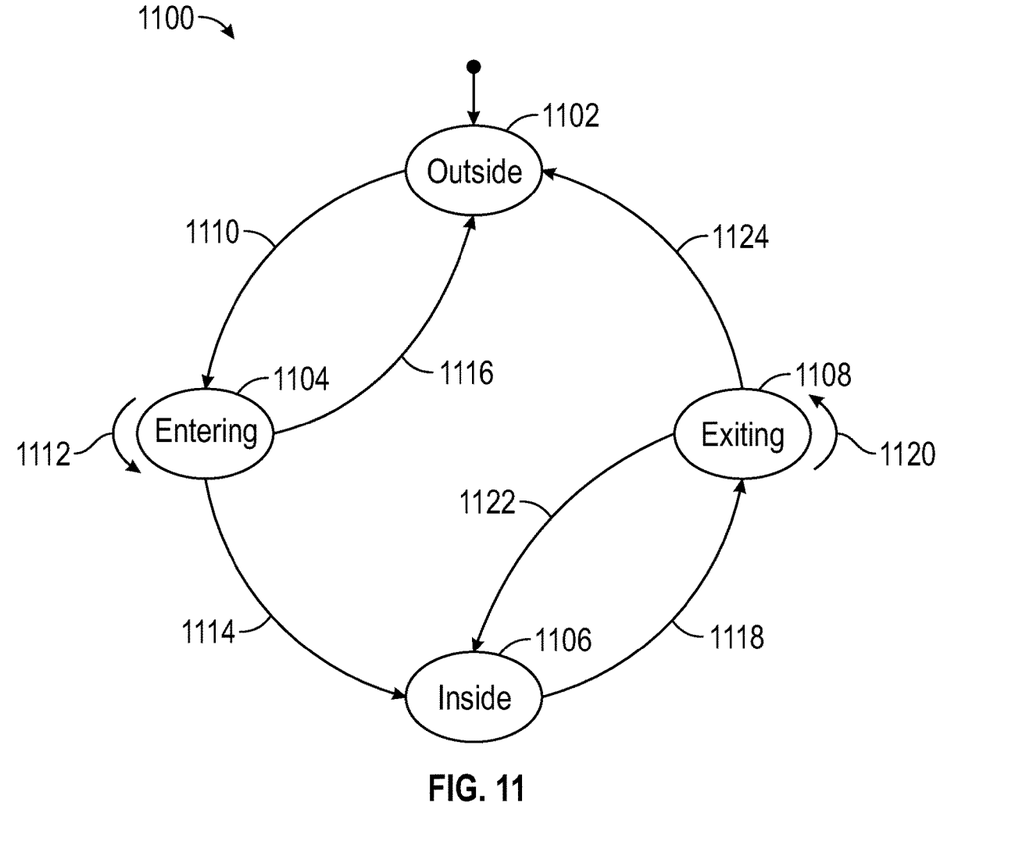
FIG. 11 depicts a state machine for parking detection for an indoor parking structure according to one or more embodiments described herein.

FIG. 11 depicts a state machine 1100 for parking detection for an indoor parking structure according to one or more embodiments described herein. This provides a two-tier geofencing system. The indoor parking structure is defined by a geofence 601 (FIG. 6), such that when the vehicle is within the geofence 601, it is determined to be within the indoor parking structure (e.g., one or more of the parking areas 501-506) and when the vehicle is not within the geofence 601, it is determined not to be within the indoor parking structure (e.g., one or more of the parking areas 501-506). Transitional zones, referred to as "entering" (block 1104) and "exiting" (block 1108), are used to determine when a vehicle transitions between being inside the parking structure (e.g., one or more of the parking areas 501-506) and outside the parking structure (e.g., one or more of the parking areas 501-506). Within these transitional zones, a counter is kept, and when the vehicle is within the transitional zone for a certain amount of time (i.e., when the counter exceeds a threshold), it is determined that the vehicle has transitioned between being within the indoor parking structure and not being within the indoor parking structure.

At block 1102, a vehicle is outside of the indoor parking structure. At block 1104, the vehicle is entering the indoor parking structure. At block 1106, the vehicle is inside the indoor parking structure. And at block 1108, the vehicle is exiting the indoor parking structure.

Arrow 1110 shows the vehicle traveling inside a geofence 601. A counter is incremented at 1112. When the counter is greater than a $T_{enter}$ timestamp, the vehicle is determined to have entered inside the indoor parking structure (1106) shown by arrow 1114 and the counter resets. However, as shown by arrow 1116, when the vehicle is outside the geofence and the GPS is not drifted, the counter is reset, and it is determined that the vehicle is outside the indoor parking structure (1102).

When the vehicle is inside the indoor parking structure (1106), arrow 1118 shows the vehicle traveling outside the geofence of the indoor parking structure when the GPS is not drifted. A counter 1120 is incremented. When the counter is greater than a $T_{exit}$ timestamp, the vehicle is determined to have exited the indoor parking structure (1106) shown by arrow 1124 and the counter resets. However, as shown by arrow 1122, when the vehicle is inside the geofence and the GPS is drifted, the counter is reset, and it is determined that the vehicle is inside the indoor parking structure (1106).

Figure 12:
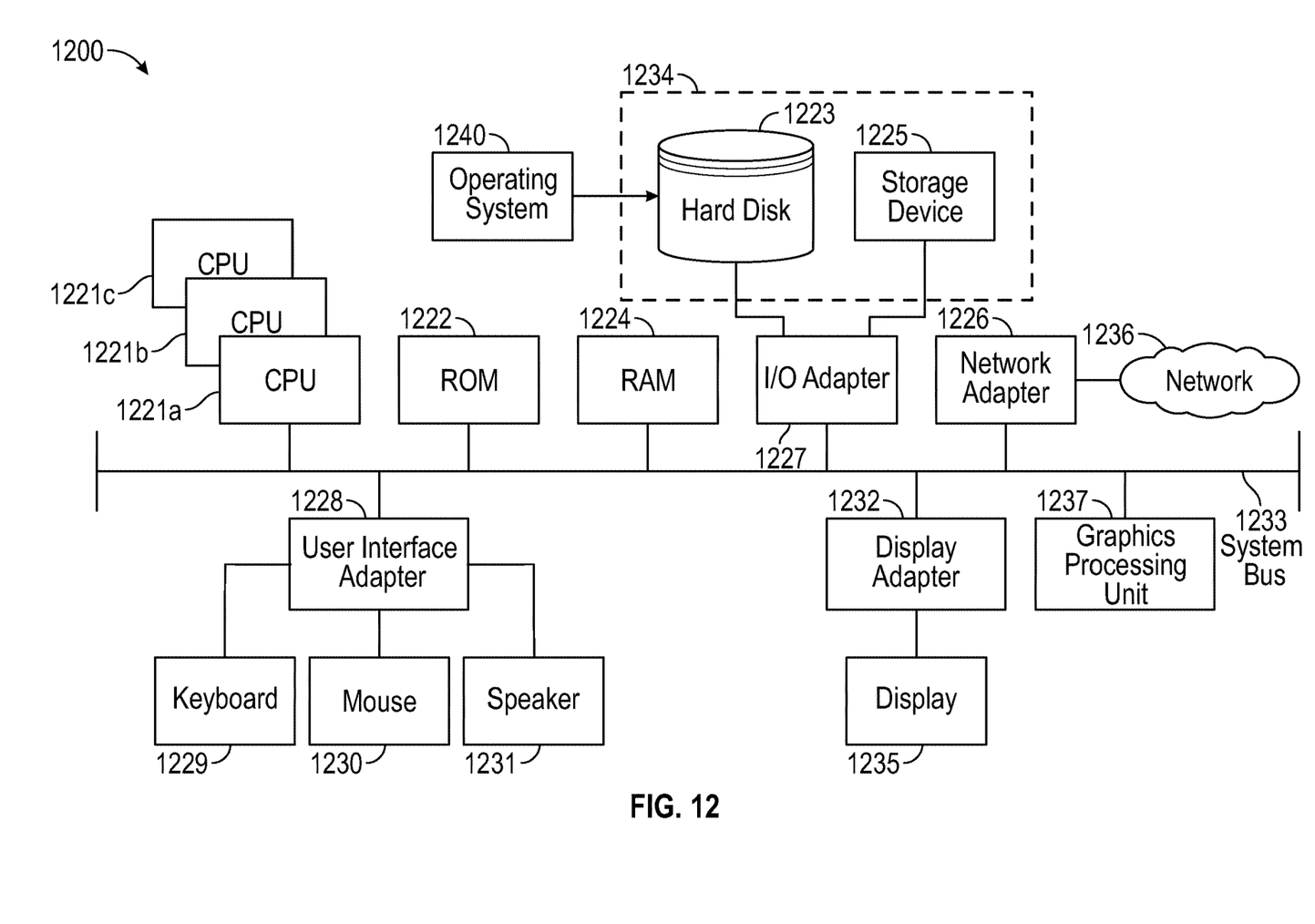
FIG. 12 depicts a block diagram of a processing system for implementing the techniques described herein according to an exemplary embodiment.

It is understood that the present disclosure is capable of being implemented in conjunction with any other type of computing environment now known or later developed. For example, FIG. 12 depicts a block diagram of a processing system 1200 for implementing the techniques described herein. In examples, processing system 1200 has one or more central processing units (processors) 1221a, 1221b, 1221c, etc. (collectively or generically referred to as processor(s) 1221 and/or as processing device(s)). In aspects of the present disclosure, each processor 1221 can include a reduced instruction set computer (RISC) microprocessor. Processors 1221 are coupled to system memory (e.g., random access memory (RAM) 1224) and various other components via a system bus 1233. Read only memory (ROM) 1222 is coupled to system bus 1233 and may include a basic input/output system (BIOS), which controls certain basic functions of processing system 1200.

Further depicted are an input/output (I/O) adapter 1227 and a network adapter 1226 coupled to system bus 1233. I/O adapter 1227 may be a small computer system interface (SCSI) adapter that communicates with a hard disk 1223 and/or a storage device 1225 or any other similar component. I/O adapter 1227, hard disk 1223, and storage device 1225 are collectively referred to herein as mass storage 1234. Operating system 1240 for execution on processing system 1200 may be stored in mass storage 1234. The network adapter 1226 interconnects system bus 1233 with an outside network 1236 enabling processing system 1200 to communicate with other such systems.

A display (e.g., a display monitor) 1235 is connected to system bus 1233 by display adapter 1232, which may include a graphics adapter to improve the performance of graphics intensive applications and a video controller. In one aspect of the present disclosure, adapters 1226, 1227, and/or 1232 may be connected to one or more I/O busses that are connected to system bus 1233 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 1233 via user interface adapter 1228 and display adapter 1232. A keyboard 1229, mouse 1230, and speaker 1231 may be interconnected to system bus 1233 via user interface adapter 1228, which may include, for example, a Super I/O chip integrating multiple device adapters into a single integrated circuit. One or more of the cameras 120-123, 130-133 are also connected to the system bus 1233.

In some aspects of the present disclosure, processing system 1200 includes a graphics processing unit 1237. Graphics processing unit 1237 is a specialized electronic circuit designed to manipulate and alter memory to accelerate the creation of images in a frame buffer intended for output to a display. In general, graphics processing unit 1237 is very efficient at manipulating computer graphics and image processing, and has a highly parallel structure that makes it more effective than general-purpose CPUs for algorithms where processing of large blocks of data is done in parallel.

Thus, as configured herein, processing system 1200 includes processing capability in the form of processors 1221, storage capability including system memory (e.g., RAM 1224), and mass storage 1234, input means such as keyboard 1229 and mouse 1230, and output capability including speaker 1231 and display 1235. In some aspects of the present disclosure, a portion of system memory (e.g., RAM 1224) and mass storage 1234 collectively store the operating system 1240 to coordinate the functions of the various components shown in processing system 1200.

The descriptions of the various examples of the present disclosure have been presented for purposes of illustration but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present techniques not be limited to the particular embodiments disclosed, but will include all embodiments falling within the scope of the application.

What is claimed is:

1. A computer-implemented method for parking prediction, the method comprising:
    receiving, by a host processing device, timestamps associated with a target vehicle and a target parking area, the timestamps being determined based at least in part on parking area data for a target parking area and vehicle data for the target vehicle, wherein the timestamps comprise an arrival timestamp, a searching timestamp, a parking timestamp, and an exiting timestamp;
    calculating, by the host processing device, an arrival rate and a service rate based on the timestamps;
    calculating, by the host processing device, a probability of parking availability for the target parking area based at least in part on the arrival rate and the service rate; and
    controlling, by the host processing device, the target vehicle based at least in part on the probability of parking availability for the target parking area.

2. The computer-implemented method of claim 1, wherein the arrival rate defines a frequency of vehicles seeking parking at the target parking area, and wherein the service rate defines an inverse of the average duration vehicles stay at the target parking area.

3. The computer-implemented method of claim 1, wherein calculating the arrival rate and the service rate based on the timestamps further comprises applying a Markov chain model to determine the arrival rate and the service rate.

4. The computer-implemented method of claim 1, wherein calculating the arrival rate and the service rate based on the timestamps further comprises applying a trace mining algorithm to the vehicle data.

5. The computer-implemented method of claim 1, wherein the vehicle processing system is located in the target vehicle and wherein the host processing system is located remotely from the target vehicle.

6. The computer-implemented method of claim 1, wherein the vehicle data for the target vehicle is received from at least one of a global positioning system module associated with the target vehicle or an electronic control unit associated with the target vehicle.

7. The computer-implemented method of claim 1, further comprising:
    receiving, by the host processing device, second timestamps from the vehicle processing system of the target vehicle, the second timestamps being determined based at least in part on parking area data for a second target parking area and the vehicle data for the target vehicle;
    calculating, by the host processing device, a second arrival rate and a second service rate based on the second timestamps; and
    calculating, by the host processing device, a second probability of parking availability for the second target parking area based at least in part on the second arrival rate and the second service rate.

8. The computer-implemented method of claim 7, further comprising:
    comparing the first probability of parking availability and the second probability of parking availability; and
    controlling the target vehicle based on the comparing.

* * * * *